United States Patent
Lord et al.

(10) Patent No.: US 7,015,979 B1
(45) Date of Patent: Mar. 21, 2006

(54) NOISY EDGE REMOVAL FOR VIDEO TRANSMISSION

(75) Inventors: Christopher J. Lord, Portland, OR (US); Karl O. Lillevold, Seattle, WA (US); Gim L. Deisher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 600 days.

(21) Appl. No.: 09/448,679

(22) Filed: Nov. 24, 1999

(51) Int. Cl.
  *H04N 5/21* (2006.01)
  *H04N 5/213* (2006.01)
  *H04N 5/217* (2006.01)
(52) U.S. Cl. .................. 348/607; 348/470; 348/616
(58) Field of Classification Search ............. 348/470, 348/616, 607, 407; 382/2, 47, 49, 50
See application file for complete search history.

(56) References Cited

U.S. PATENT DOCUMENTS

| | | | | |
|---|---|---|---|---|
| 4,484,230 A | * | 11/1984 | Pugsley | 348/616 |
| 4,706,132 A | * | 11/1987 | Takayama et al. | 348/616 |
| 4,807,033 A | * | 2/1989 | Keesen et al. | 348/616 |
| 5,353,059 A | * | 10/1994 | Lawlor et al. | 348/389 |
| 5,541,667 A | * | 7/1996 | Saito | 348/616 |
| 6,064,776 A | * | 5/2000 | Kikuchi et al. | 348/407 |
| 6,226,050 B1 | * | 5/2001 | Lee | 348/607 |
| 6,229,578 B1 | * | 5/2001 | Acharya et al. | 348/607 |
| 6,369,859 B1 | * | 4/2002 | Watkins | 348/616 |
| 6,535,254 B1 | * | 3/2003 | Olsson et al. | 348/607 |

OTHER PUBLICATIONS

Poynton, Charles A., "A Technical Introduction to Digital Video", Copyright 1996, Chapter I, pp. 1-31.

* cited by examiner

*Primary Examiner*—John Miller
*Assistant Examiner*—Trang U. Tran
(74) *Attorney, Agent, or Firm*—Trop, Pruner & Hu, P.C.

(57) ABSTRACT

A method for removing noise from a video input, prior to encoding includes receiving a frame of a video signal, identifying noise within the frame, and eliminating the noise from the frame. The video frame may then be encoded.

33 Claims, 7 Drawing Sheets

VIDEO FRAME

VIDEO FRAME

VIDEO FRAME

VIDEO FRAME

NOISY EDGE REMOVAL FOR VIDEO TRANSMISSION

BACKGROUND

This invention relates to digital video technology and, more particularly, to video encoding.

Digital video is formed from a sequence of images produced by a video camera. The individual images are called video frames. To produce the illusion of motion, video frames are transmitted at 20 frames per second or higher, such that the human eye does not isolate individual frames. The eye then perceives the video images as a continuous video stream.

Transmitting video may use more bandwidth than transmitting audio. A throughput of 75 Mbits per second is common for digital video while an audio transmission might occur at only 75 Kbits per second. A 56 K baud modem transmits up to 56 K bits per second. Thus, before transmitting digital video from computer to computer, an encoding scheme is typically employed.

A number of digital video encoding standards are used today. For example, some may use temporal redundancy to encode video. Temporal redundancy is the repetition observed between consecutive video frames. Using temporal redundancy, the changes from one frame to another may be stored instead of storing each entire frame before transmission.

Many personal computer-based digital video capture systems produce noisy lines along the edges of video frames. For example, the noise may result from improper handling of closed captioning signals. Alternatively, limitations in the associated hardware devices or software drivers may produce such noise.

Before being transmitted across a telephone line or other media, the video frames are typically compressed or encoded. Like all the other pixels of the video frame, the noisy pixels are encoded. The noisy edge pixels may be difficult to encode. The noisy pixels are often random and vary significantly from frame to frame. The temporal redundancy is thus reduced, so more bits may be used to encode the noisy frames than frames without the noise. Further, when a video image is subdivided during the encoding process, the noisy lines along the edges of video frames may result in spurious frequency transform coefficients which are encoded along with the image. After decompression of the encoded noise, particularly at low bit rates, severe ringing artifacts may be visible along the noisy edges of the displayed video frame.

Thus, there is a continuing need for a mechanism for encoding video frames that have noise.

SUMMARY

In accordance with one embodiment of the invention, a method includes receiving a video frame, identifying noise in a first portion of the video frame, and replacing the first portion with a second portion of the video frame.

Advantages and other features of the invention will become apparent from the following description, the drawings, and the claims.

DETAILED DESCRIPTION

In accordance with one embodiment of the invention, noisy edges in video frames may be removed to achieve higher frame rates and better quality video. The noisy edge removal mechanism may be used with applications which employ digital video encoding of captured content. Examples include video conferencing, video phone, network streaming video, and others.

By detecting the presence of noisy edges in a video frame, a noisy line may be removed and replaced by a clean neighboring line prior to encoding. Noise may be removed from the top edge, either side edge, or the bottom edge of the video frame 10 as needed.

Figure 1:
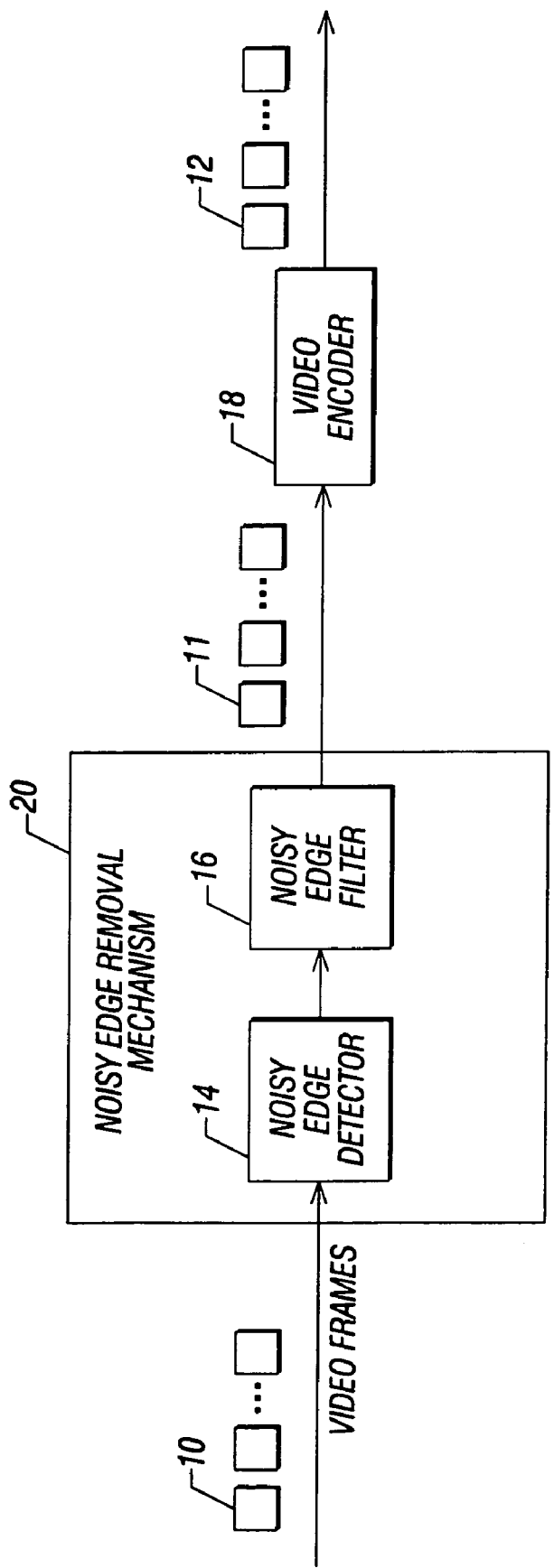
FIG. 1 is a block diagram of the noisy edge removal mechanism according to one embodiment of the invention.

Turning to FIG. 1, a noisy edge removal mechanism 20 may filter noise from a video frame 10 prior to entering a video encoder 18. In one embodiment of the invention, the noisy edge removal mechanism 20 includes a noisy edge detector 14 and a noisy edge filter 16.

Initially, the noisy edge detector 14 receives a frame 10. The frame 10 is one of a plurality of frames 10 which make up a stream of video. The noisy edge removal mechanism 20 may be invoked for each frame 10 of the video stream, one at a time.

Figure 2A:
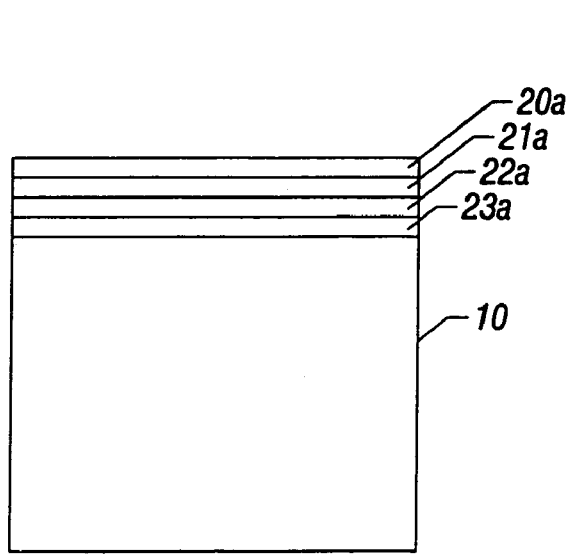
FIG. 2a is a diagram of a top edge of a video frame according to one embodiment of the invention.

For each frame 10, the noisy edge detector 14 analyzes one or more edges of the video frame 10. In one embodiment of the invention, an edge of the video frame 10 is selected, then divided into four equally sized portions. In FIG. 2a, the top edge of the video frame 10 is divided into portions 20a, 21a, 22a, and 23a. These portions may be rows of the video frame 10, for example.

Figure 2B:
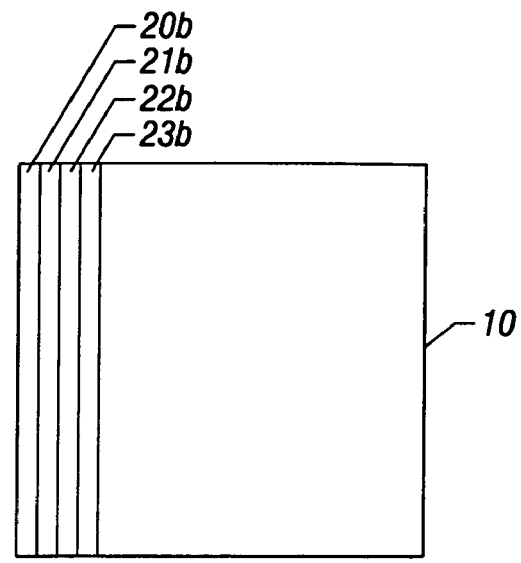
FIG. 2b is a diagram of a left edge of a video frame according to one embodiment of the invention.
Figure 2C:
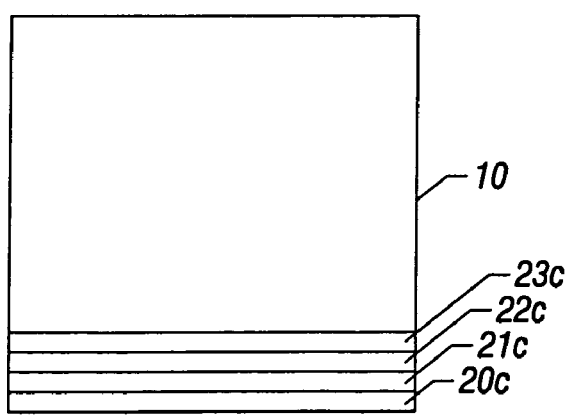
FIG. 2c a diagram of a bottom edge of a video frame according to one embodiment of the invention.
Figure 2D:
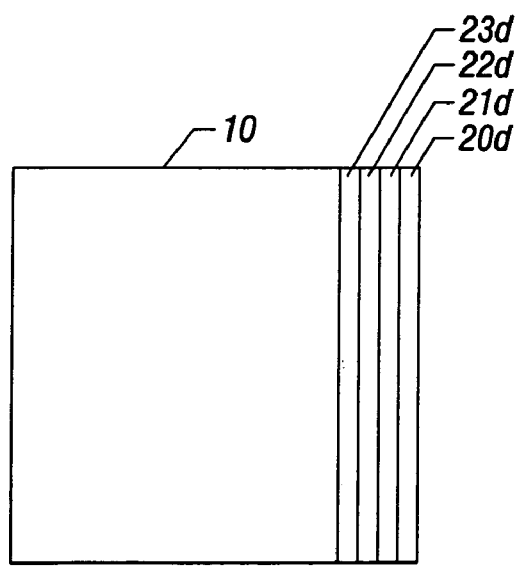
FIG. 2d a diagram of a right edge of a video frame according to one embodiment of the invention.

In FIG. 2b, the left edge of the video frame 10 is divided into portions 20b, 21b, 22b, and 23b. These portions may be columns of the video frame 10, for example. In FIG. 2c, the bottom edge of the video frame 10 is divided into portions 20c, 21c, 22c, and 23c. In FIG. 2d, the right edge of the video frame is divided into portions 20d, 21d, 22d, and 23d.

Figure 3:
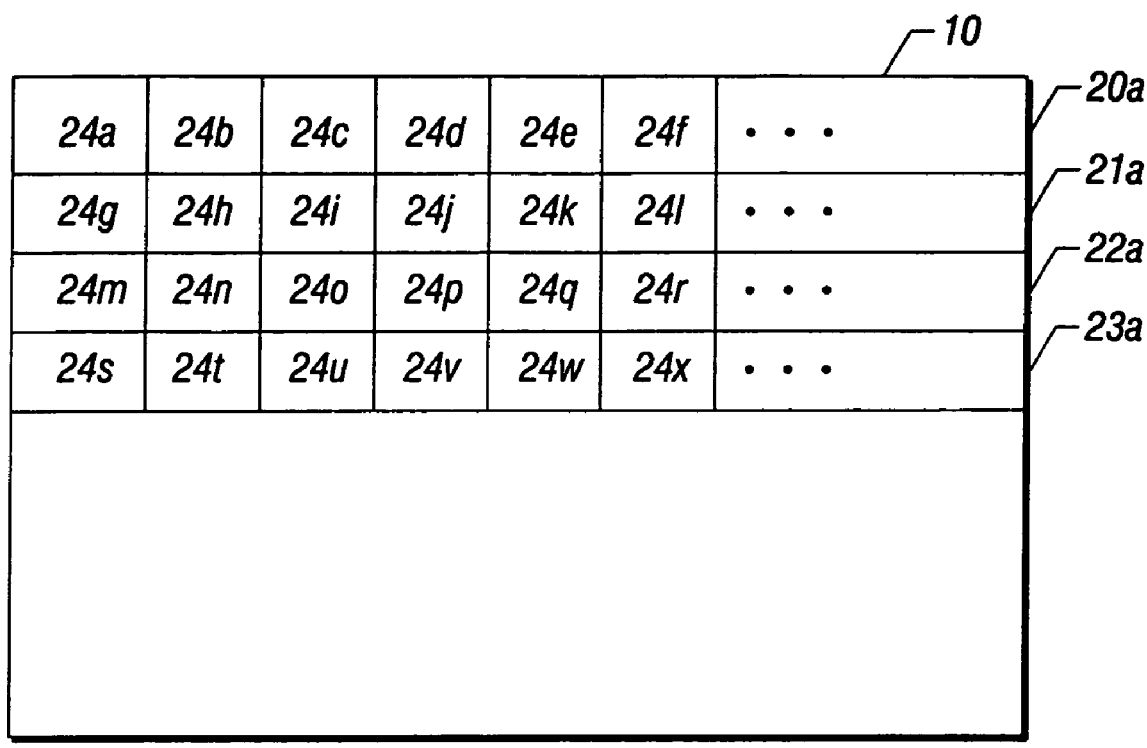
FIG. 3 is a diagram of a video frame divided into units according to one embodiment of the invention.

Once the edge of the video frame 10 is divided into portions of equal size, the portions are then subdivided into units of equal size. In FIG. 3, a part of the video frame 10 of FIG. 2a is subdivided into a plurality of units 24. Portion 20a includes units 24a, 24b, 24c, 24d, 24e, and 24f. Portion 21a includes units 24g, 24h, 24i, 24j, 24k, and 24l. Portion 22a includes units 24m, 24n, 24o, 24p, 24q, and 24r. Portion 23a includes units 24s, 24t, 24u, 24v, 24w, and 24x.

Each unit 24 of the video frame 10 is associated with a value. For example, a video display may be subdivided into pixels. Each pixel commonly has a value associated with the pixel, which may be stored in video memory. Each unit 24 of FIG. 3 may likewise be associated with a distinct value.

In one embodiment of the invention, the noisy edge detector 14 determines the presence of noise based, in part, on comparisons between the values of the units 24 of the video frame 10. If adjacent units 24 are not similar, for example, noise may sometimes be inferred. So, once the video frame 10 is divided into discrete units 24, each one of which is assigned a value, mathematical operations may be performed to analyze the video frame 10.

Comparisons between values of the units 24 may be made using mathematical operations. In one embodiment, the values of the units 24 in one portion are compared to the values of the units 24 in a second, adjacent portion. The results of these comparisons are added together, to arrive at a result which is representative of the relationship between the two portions. A second pair of portions is likewise analyzed, supplying a second result, and so on. These results are then compared, and analyzed against one or more threshold values. In one embodiment of the invention, the threshold values may be adaptable to the type of noise or other criteria.

Figure 4:
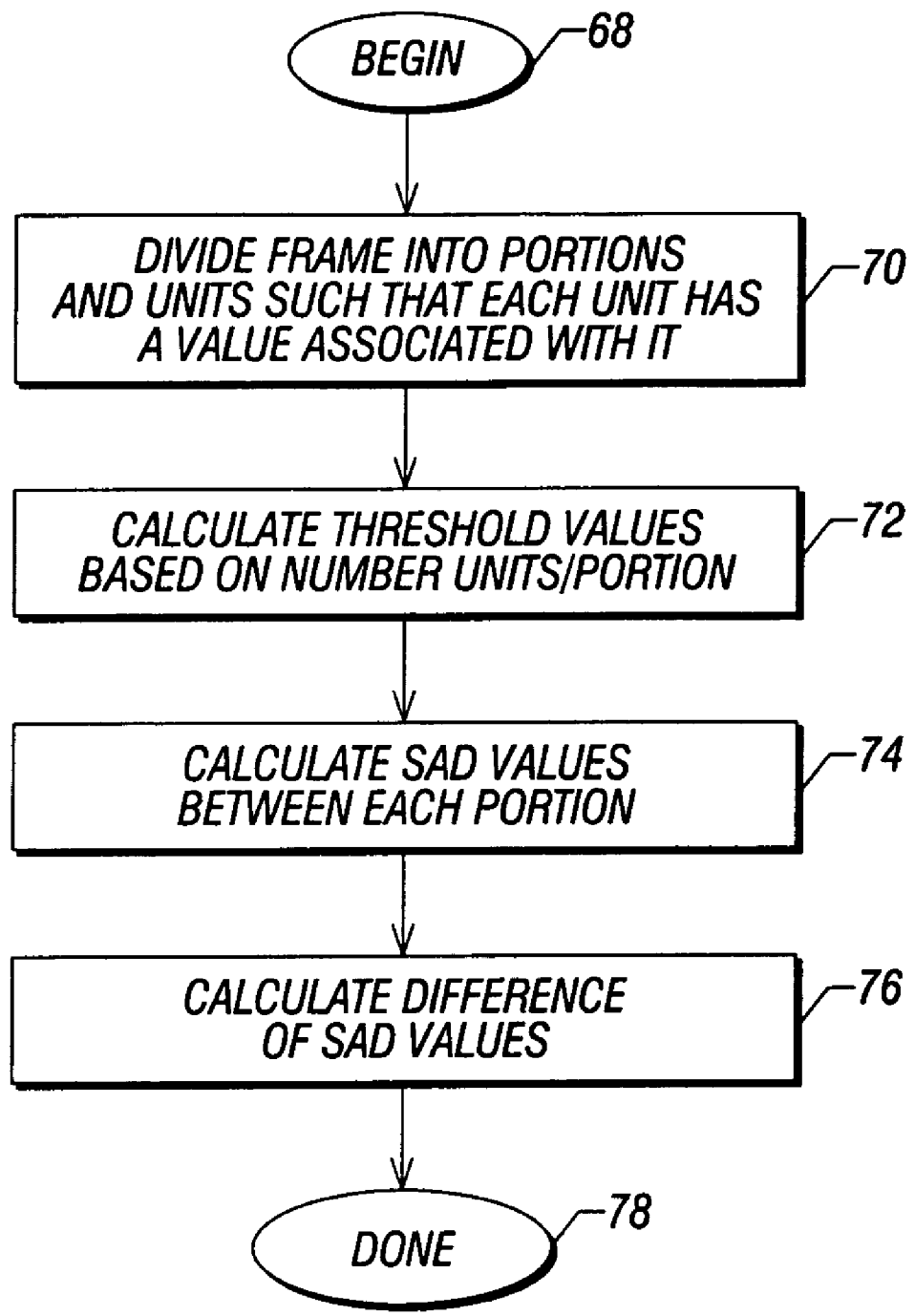
FIG. 4 is a flow diagram of calculations performed during noisy edge detection according to one embodiment of the invention.

In FIG. 4, an analysis of the video frame 10, according to one embodiment of the invention, commences with the selection of an edge of the video frame (top, right, left, or bottom), subdivision of the video frame 10 into portions of equal size, and further subdivision in to units 24 (block 70). Although the following examples describe dividing an edge of the video frame 10 into four portions, the analysis hereinafter described may be performed on a larger or smaller number of portions, as desired.

A value is associated with each unit 24. The value may be an 8-bit binary value, a 16-bit binary value, or other value. The values are used to compare each unit 24 with another unit 24 in order to detect the presence of noise in the video frame 10.

Once the edge of the video frame 10 has been subdivided into units 24, a pair of threshold values, T1 and T2, may be calculated (block 72). The threshold values are used to determine whether a value associated with one portion 20, 21, 22 or 23 of the video frame 10 varies significantly from a value associated with a second portion 20, 21, 22, or 23 of the video frame 10.

In one embodiment of the invention, these threshold values are based upon two variables, $\alpha$ and $\beta$. The values for $\alpha$ and $\beta$ may be determined by analyzing one or more video frames 10 in which noise is known to be present. The values for $\alpha$ and $\beta$ may also be based upon the source of the noise. For example, noise which results from the improper handling of closed captioning signals may produce a certain, predictable type of noise, to which a particular $\alpha$ value may be assigned. Alternatively, certain types of video capture devices may produce noise along the edges of the video frame, and thus a particular $\alpha$ or $\beta$ variable may be appropriate. The a variable is presumed larger than the $\beta$ variable, so that both a "stronger" (or larger) threshold value and a "weaker" (or smaller) threshold value may be used to analyze the edge of the video frame 10.

In one embodiment of the invention, once the $\alpha$ and $\beta$ variables are known, T1 and T2 may be calculated based upon the following formulas:

$$T_1 = (\text{\# units/portion}) \times \alpha$$

$$T_2 = (\text{\# units/portion}) \times \beta$$

where $\alpha > \beta$. Because $\alpha > \beta$, the threshold value T1 is greater than the threshold value T2.

In addition to being created based upon the type of noise and other criteria, the $\alpha$ and $\beta$ variables, and thus the threshold values, T1 and T2, may be changed during the analysis of the input video signal. For example, following analysis of the first few video frames 10 of a video signal, the $\alpha$ and $\beta$ variables may be adjusted, if desired.

Looking back at FIG. 4, a comparison of units 24 along an edge of the video frame 10 is performed (block 74). The comparison may be performed in a number of ways. In one embodiment of the invention, all units 24 of one portion are subtracted from all units 24 of an adjacent portion, to arrive at a plurality of results, the absolute values of which are then added together. This is called the sum of absolute differences, or SAD.

For example, looking back at FIG. 3, the sum of absolute differences between portions 20a and 21a is:

$$SAD_{20a21a} = |(24a-24g)+(24b-24h)+(24c-24i)+(24d-24j)+(24e-24k)+(24f-24l)+ \ldots |$$

where "24a" means "the value of unit 24a," etc. The sum of absolute differences between portions 21a and 22a is:

$$SAD_{21a22a} = |(24g-24m)+(24h-24n)+(24i-24o)+(24j-24p)+(24k-24q)+(24l-24r)+ \ldots |$$

and the sum of absolute differences between portions 22a and 23a is:

$$SAD_{22a23a} = |(24m-24s)+(24n-24t)+(24o-24u)+(24p-24v)+(24q-24w)+(24r-24x)+ \ldots |$$

Following these calculations, three values, $SAD_{20a21a}$, $SAD_{21a22a}$, and $SAD_{22a23a}$ result. These SAD values provide a discrete measure for analysis of the portions 20 through 23 of the video frame 10, not just the units 24 contained therein.

Although the units 24 for four portions are compared to arrive at three SAD results, comparison of five portions to arrive at four SAD results, comparison of six portion to arrive at five SAD results, and so on, may be made. Alternatively, two portions may be compared to arrive at a single SAD result or three portions may be compared to arrive at two SAD results.

Turning back to FIG. 4, once the SAD values for the portions 20 through 23 are determined, these values may be analyzed as well (block 76). In one embodiment of the invention, the "adjacent" SAD values are subtracted from one another, to arrive at one or more difference values, Dn.

For example, in the video frame 10 of FIG. 3, because there are three SAD values, two difference values, $D_1$ and $D_2$, may be calculated as follows:

$$D_1 = |SAD_{20a21a} - SAD_{21a22a}|$$

$$D_2 = |SAD_{21a22a} - SAD_{22a23a}|$$

The difference value, $D_1$, results from calculations related to portions of the video frame 10 which are relatively closer to the edge of the video frame 10, such as portions 20a, 21a, and 22a. The difference value, $D_2$, results from calculations of portions related to the video frame 10 which are relatively further from the edge of the video frame 10, such as portions 21a, 22a, and 23a. Where more than three SAD values are calculated, more difference values may likewise be calculated, as needed.

In one embodiment of the invention, once the difference values, $D_1$ and $D_2$, are calculated, they may then be analyzed against the threshold values, $T_1$ and $T_2$. Recall that the threshold value $T_1$ is calculated based upon the variable $\alpha$ while the threshold value $T_2$ is calculated based upon the variable $\beta$. In one embodiment of the invention, $\alpha$ is greater than $\beta$. Accordingly, $T_1$ is greater than $T_2$ in value. Thus, a difference value which is larger than $T_1$ is presumed to be more likely to have noise than a difference value which is larger than $T_2$.

In one embodiment of the invention, the presence of noise in a previous video frame 10 is relevant to the analysis of one or more subsequent frames. Recall from FIG. 1 that the noisy edge detection mechanism 20 receives each video frame 10 of the input video signal, one after another. Thus, the result of the analysis of a prior frame may be used in the analysis of subsequent frames.

A Boolean variable, NOISEFOUND, may be used to keep track of noise found in a previous frame. The variable may then be used during analysis of a subsequent frame. Although the variable NOISEFOUND provides information about the detection of noise from a single prior frame, multiple variables may alternatively be included in the analysis of multiple subsequent frames, as desired.

Figure 5:
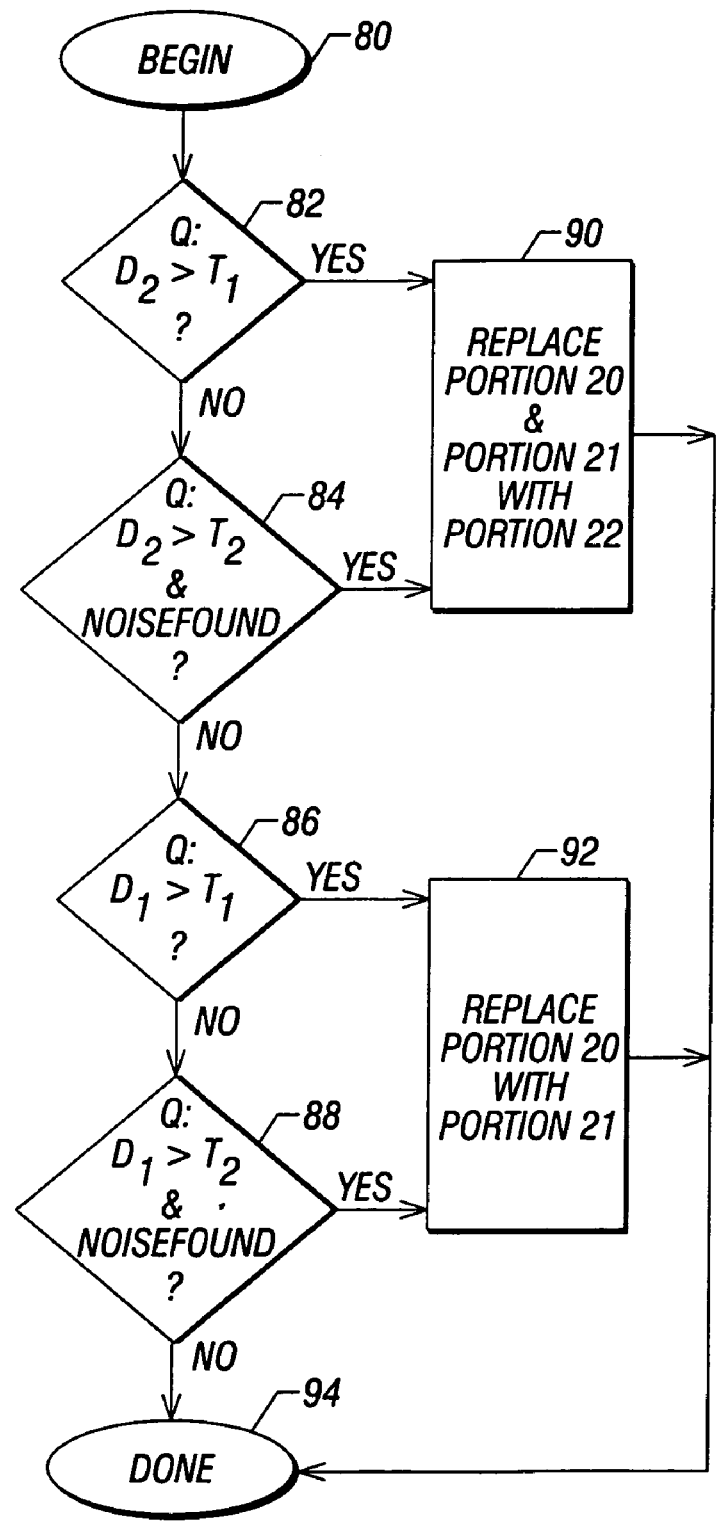
FIG. 5 is a flow diagram of noisy edge analysis and filtration according to one embodiment of the invention.

In accordance with one embodiment of the present invention, the analysis includes four comparisons between the values, $D_1$, $D_2$, $T_1$, and $T_2$, as shown in FIG. 5. In one comparison, if $D_2$ is greater than $T_1$, because $T_1$ is the larger threshold value, noise is presumed to be found (diamond 82). Accordingly, two outermost portions, portion 20 and portion 21 of the video frame 10 are replaced with a third portion, portion 22, which is closer in from the edge of the video frame 10 (block 90).

For example, in FIG. 2c, portions 20c and 21c is replaced with portion 22c. The edge of the video frame 10 then includes, from the outside in, portions 20c, 20c, 20c, and 23c (the fourth portion, 23c, is not replaced).

Next, $D_2$ is compared to $T_2$ (diamond 84). If $D_2$ is larger than $T_2$, then $D_2$ is in between the two threshold values, $T_1$ and $T_2$. If, $D_2$ is between the two threshold values, and noise was found in the previous frame (as denoted by NOISE-FOUND being TRUE), noise is presumed to be found (diamond 84). The two outermost portions, portion 20 and portion 21, of the video frame 10 are replaced with a third portion, portion 22, which is closer in from the edge of the video frame 10 (block 90).

Next, the difference value $D_1$ is compared to the threshold values. If $D_1$ is larger than $T_1$ (diamond 86), a first portion 20 of the video frame 10 is replaced with a second portion 21 which is farther from the edge (block 92). For example, in FIG. 2d, portion 20d is replaced with portion 21d. The edge of the video frame 10 then includes, from the outside in, portions 21d, 21d, 22d, and 23d.

The difference value $D_1$ is then compared to the second threshold value $T_2$ (diamond 86). If $D_1$ is in between the two threshold values and noise was found in the previous frame, a first portion 20 of the video frame 10 is replaced with a second portion 21 which is farther from the edge (block 92). If $D_1$ is smaller than both threshold values, $T_1$ and $T_2$, then no noise is presumed, and no action is taken (block 94).

Recall that $D_1$ relates to portions 20 through 22 of the video frame 10 which are relatively closer to the edge, while $D_2$ relates to portions 21 through 23 of the video frame which are relatively farther from the edge. Accordingly, in the analysis of $D_1$, the replacement of a single portion 20 with a second portion 21, occurs (block 92), while, in the analysis of $D_2$, the replacement of two portions, portions 20 and 21, with a third portion, portion 22, occurs (block 90).

The above calculations identify noise by observing the spatial correlation between the portions 20 through 23 along the edge of the video frame 10. In other words, how similar portions 20 through 23 are to one another help to identify noise in the video frame 10. In addition to the calculations, noise detection in the previous frame may be included in analyzing the current frame. Once the noisy edge detector 14 has completed the analysis, the noisy edge filter 16 may replace one or more portions of the video frame 10 with a clean neighboring portion, in one embodiment of the invention. A new video frame 11 may then enter the video encoder 18.

Figure 6:
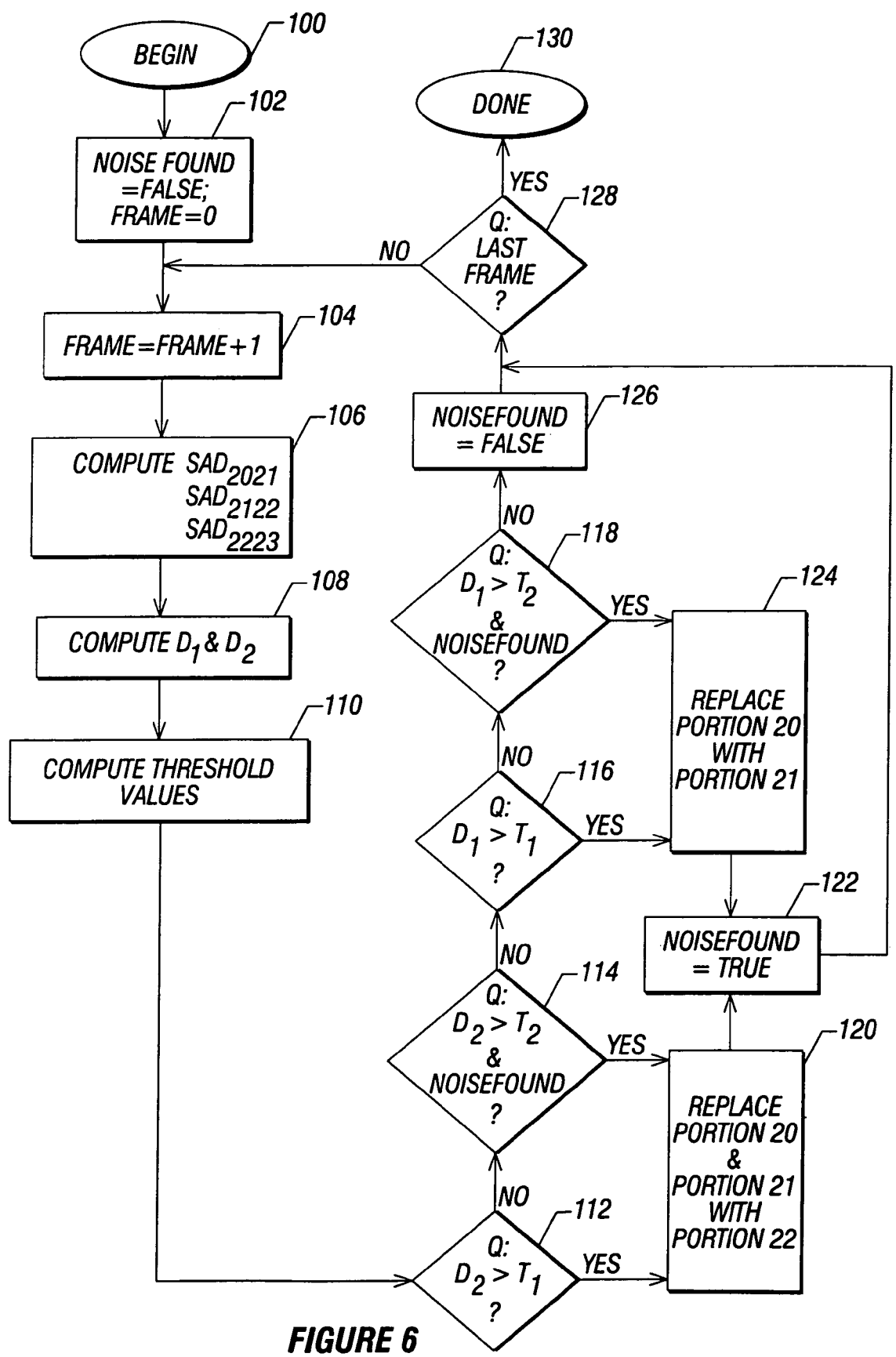
FIG. 6 is a flow diagram of the noisy edge removal mechanism according to one embodiment of the invention.

A software program, for implementing one embodiment of the invention, shown in FIG. 6, begins by clearing the Boolean variable, NOISEFOUND (block 102). NOISE-FOUND indicates whether the previous frame required noise removal. An integer variable, FRAME, is also cleared to zero. FRAME keeps track of the current frame. FRAME is incremented (block 104).

For the current video frame received, the sum of absolute differences for the first four portions 20 through 23 of the video frame 10 is calculated (block 106). These calculations result in three values, $SAD_{2021}$, $SAD_{2122}$, and $SAD_{2223}$. Although four portions of the video frame 10 are analyzed in the example, this number may be adjusted to a larger or smaller number, as desired.

From the SAD values, two difference values, $D_1$, and $D_2$, are calculated. $D_1$ is the absolute value of the difference between $SAD_{2021}$ and $SAD_{2122}$. Likewise, the second difference value, $D_2$, represents the difference between $SAD_{2122}$ and $SAD_{2223}$. The threshold values, $T_1$ and $T_2$, are calculated (block 110). Once the calculations $D_1$, $D_2$, $T_1$, and $T_2$ are completed, analysis of the video frame 10 for noise may begin.

In one embodiment of the invention, a series of queries determines whether the difference values $D_1$ and $D_2$ exceed the threshold values $T_1$ and $T_2$ (diamond 112). If the second difference value, $D_2$, is greater than the first threshold value, $T_1$, then noise has been detected. Accordingly, portions one and two of the video frame 10 are replaced with portion three (block 120). Further, the variable NOISEFOUND is set to TRUE (block 122), indicating that noise was found on the current frame. During analysis of subsequent frames, the variable NOISEFOUND is again tested.

Next, if the second difference value, $D_2$, exceeds the second threshold value, $T_2$, and the variable NOISEFOUND is TRUE, then noise has again been detected (diamond 114). Again, portions one and two are replaced with portions three of the video frame 10 (block 120).

Where the first two calculations fail to result in noise detection, a second pair of inquiries may be initiated. The first difference value, $D_1$, is compared to the first threshold value, $T_1$ (diamond 116). If $D_1$ is larger, noise has been detected. In contrast to the result in block 120, however, only portion one is replaced with portion two (block 124). Otherwise, $D_1$ may be compared with the second threshold value, $T_2$. If $D_1$ is greater than $T_2$ and the variable NOISE-FOUND is TRUE, then noise is detected (diamond 118). Again, portion one is replaced with portion two (block 124).

The variable NOISEFOUND is set to TRUE (block 122). Otherwise, the variable NOISEFOUND is set to FALSE (block 126).

Following updates of the variable NOISEFOUND (block 122 and 126), the noisy edge removal mechanism 20 inquires whether the last frame has been reached (diamond 128). If so, the operation is complete (block 130). Otherwise, the variable FRAME is incremented and the process is repeated (block 104).

Figure 7:
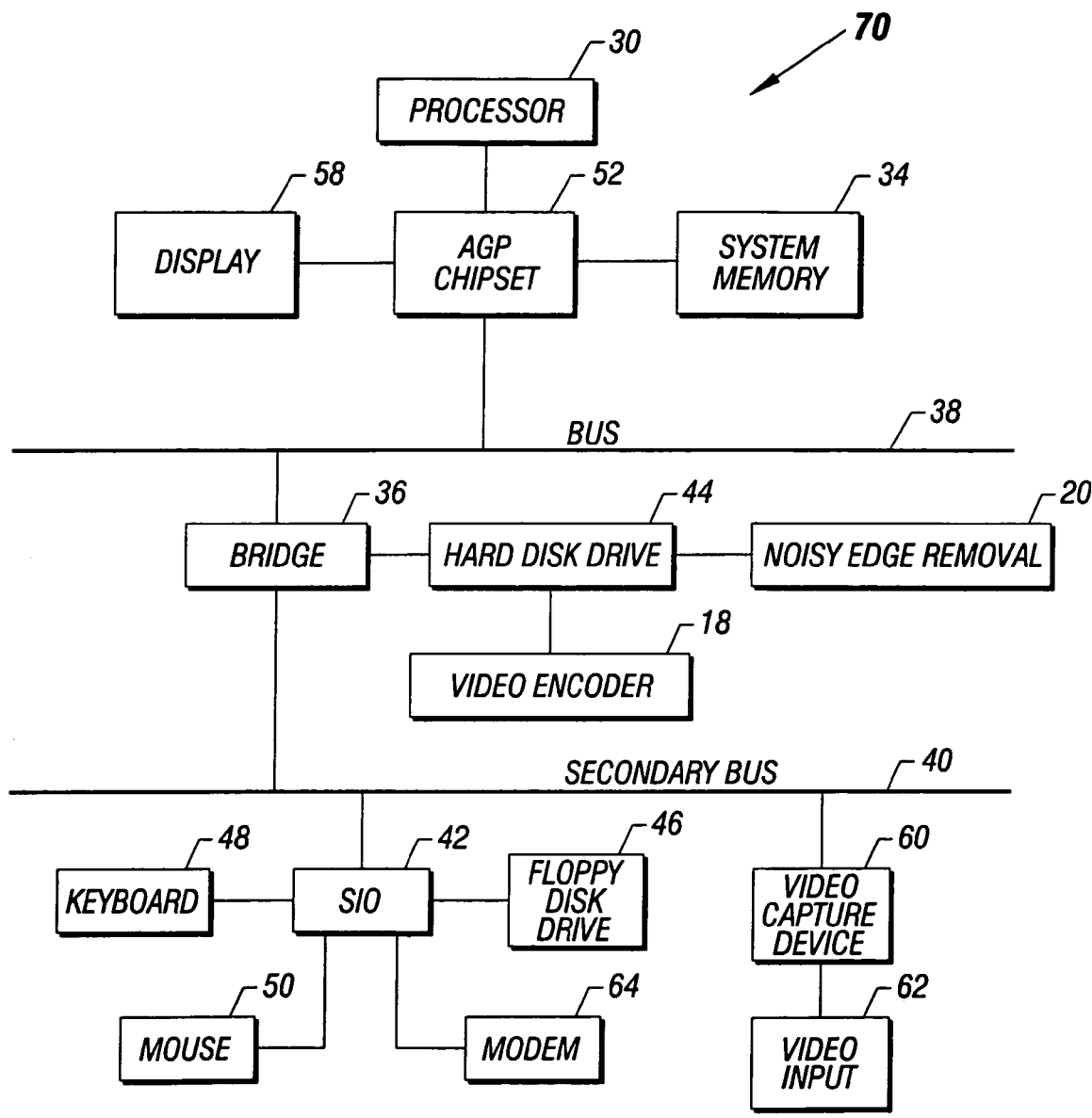
FIG. 7 is a block diagram of a system using the noisy edge removal mechanism according to one embodiment of the invention.

In FIG. 7, in accordance with one embodiment of the invention, a processor-based system 70 may include a processor 30 coupled to an accelerated graphics port (AGP) chipset 52. The Accelerated Graphic Port Specification, Rev. 2.0 is available from Intel Corporation of Santa Clara, Calif. The AGP chipset 52 is coupled to a display 58 and a system memory 34. The AGP chipset 52 is further coupled to a bus 38, for coupling to other circuitry of the processor-based system 70.

A bridge 36 coupled between the bus 38 and a secondary bus 40 is coupled to a hard disk drive 44. The noisy edge removal mechanism 20 and the video encoding software 18 may be stored on the hard disk drive 44. A multi-function, super I/O, or SIO, chip 42, coupled to the secondary bus 40, may support several devices in the processor-based system 70, including a floppy disk drive 46, a keyboard 48, a mouse 50 and a modem 64. Also coupled to the secondary bus 40 is a video capture device 60. A video input signal 62 may enter the system 70 from the video capture device 60.

The noisy edge removal mechanism 20 may be stored on the hard disk drive 44 such that, upon receiving the video input signal 62, the noisy edge removal program 20 is loaded into the memory 34 and executed. The video encoder 18, also stored on the hard disk drive 44 in one embodiment of the invention, may be used to encode the resulting frames.

In some embodiments of the invention, a noisy edge removal mechanism may remove noisy edges from a video frame prior to transmission. Where noisy edges are removed from a digital image, temporal prediction between frames of the digital image may result. In a digital image where temporal prediction improves, fewer bits may be used to encode the digital image. Where noisy lines are removed from a digital image, spurious frequency transform coefficients may be reduced. Where fewer bits are used to encode a digital image, a faster frame rate may result or the video quality may improve.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a video frame;
   identifying noise in a first portion of the video frame; and
   replacing the first portion with a second portion of the video frame.

2. The method of claim 1, wherein identifying further comprises:
   associating a noise level with the first portion of the video frame; and
   comparing the noise level to a predetermined value.

3. The method of claim 2, wherein associating further comprises distinguishing the first portion from the second portion.

4. The method of claim 3, wherein distinguishing further comprises:
   associating a first value with the first portion;
   associating a second value with the second portion; and
   performing a plurality of arithmetic operations between the first value and the second value.

5. The method of claim 4, wherein associating a first value with the first portion further comprises:
   identifying a plurality of values associated with the first portion; and
   performing an arithmetic operation on the plurality of values to render the first value.

6. The method of claim 2, wherein comparing the noise level to a predetermined value comprises comparing the noise level to a noise level found in a second video frame.

7. The method of claim 2, wherein comparing the noise level to a predetermined value comprises associating the predetermined value to the type of video input signal.

8. The method of claim 2, wherein comparing the noise level to a predetermined value comprises associating the predetermined value to the type of noise in the video frame.

9. The method of claim 1, further comprising encoding the replaced first portion of the video frame.

10. The method of claim 1, further comprising replacing a first line of the video frame with a second line of the video frame.

11. The method of claim 1, wherein the noise results from handling closed caption signals.

12. A system including:
   a bus;
   a processor coupled to the bus;
   a device coupled to the bus to receive a video signal; and
   a storage medium coupled to the bus including a software program that, if executed, enables the system to:
      detect noise in a first portion of a video frame of the video signal; and
      replace a first portion of the video frame with a second portion of the video frame.

13. The system of claim 12, wherein the video frame is stored in a memory and, if executed, the software program enables the system to write to the memory to replace the first portion of the video frame.

14. The system of claim 13, wherein, if executed, the software program enables the system to further detect noise by comparing a noise level associated with the first portion of the video frame with a predetermined value.

15. The system of claim 14, wherein the predetermined value is stored in the memory.

16. The system of claim 15, wherein the predetermined value is related to a noise level found in a second video frame.

17. The system of claim 15, wherein the predetermined value is related to the type of video signal.

18. The system of claim 12, wherein the storage medium is a hard disk drive.

19. An article comprising a medium storing instructions that cause a processor-based system to:
   locate a video frame of a video signal;
   identify noise in a first portion of the video frame; and
   replace the first portion with a second portion of the video frame.

20. The article of claim 19, further storing instructions that cause the processor-based system to locate the video frame by reading a memory device.

21. The article of claim 20, further storing instructions that cause the processor-based system to:

associate a noise level with the first portion of the video frame; and compare the noise level to a predetermined value.

22. The article of claim 21, further storing instructions that cause the processor-based system to:

associate a first value with the first portion;

associate a second value with the second portion; and perform a plurality of arithmetic operations between the first value and the second value.

23. The article of claim 22, further storing instructions that cause the processor-based system to:

identify a plurality of values associated with the first portion; and perform an arithmetic operation on the plurality of values to render the first value.

24. The article of claim 21, further storing instructions that cause the processor-based system to compare the noise level to a predetermined value by associating the predetermined value with a noise level found in a second video frame.

25. The article of claim 19, wherein the medium storing instructions is a memory device.

26. The article of claim 21, further storing instructions that cause the processor-based system to compare the noise to a predetermined value by associating the predetermined value to the type of video signal.

27. The article of claim 21, further storing instructions that cause the processor-based system to compare the noise to a predetermined value by associating the predetermined value to the type of noise in the video frame.

28. A method comprising:

receiving a video frame;

analyzing a first portion of the video frame with a first adjacent portion of the video frame to obtain a first result;

analyzing a second portion of the video frame with a second adjacent portion of the video frame to obtain a second result; and replacing the first portion of the video frame with one of the second portion, the first adjacent portion or the second adjacent portion if a comparison between the first result and the second result is indicative of noise.

29. The method of claim 28, wherein each of the first and second portions and the first and second adjacent portions comprises a plurality of units, and wherein the analyzing is performed on a unit by unit basis.

30. The method of claim 29, further comprising calculating a first threshold based upon an amount of the plurality of units per the respective portion.

31. The method of claim 30, wherein the first and second results comprise a sum of absolute differences between the first portion and the first adjacent portion and the second portion and the second adjacent portion, respectively.

32. The method of claim 30, wherein the comparison is indicative of noise if a difference between the first result and the second result exceeds the first threshold.

33. The method of claim 28, wherein the first portion comprises an edge portion of the video frame.

* * * * *